(12) United States Patent
Borucki et al.

(10) Patent No.: US 9,299,203 B2
(45) Date of Patent: Mar. 29, 2016

(54) ACCESS LEVEL MANAGEMENT TECHNIQUES

(71) Applicant: NCR Corporation, Duluth, GA (US)

(72) Inventors: Robert Thomas Borucki, Mesa, AZ (US); Jared Keith Miller, Cumming, GA (US)

(73) Assignee: NCR Corporation, Duluth, GA (US)

( * ) Notice: Subject to any disclaimer, the term of this patent is extended or adjusted under 35 U.S.C. 154(b) by 7 days.

(21) Appl. No.: 13/753,733

(22) Filed: Jan. 30, 2013

(65) Prior Publication Data

US 2014/0209674 A1 Jul. 31, 2014

(51) Int. Cl.

| | |
|---|---|
| *G06F 17/00* | (2006.01) |
| *G07C 9/00* | (2006.01) |
| *G06K 1/00* | (2006.01) |
| *G06K 7/10* | (2006.01) |
| *H04L 29/06* | (2006.01) |
| *H04W 4/02* | (2009.01) |
| *G06Q 10/02* | (2012.01) |
| *G06F 21/36* | (2013.01) |

(52) U.S. Cl.
CPC ............ *G07C 9/00103* (2013.01); *G06F 21/36* (2013.01); *G06K 1/00* (2013.01); *G06K 7/10544* (2013.01); *G06Q 10/02* (2013.01); *H04L 63/0807* (2013.01); *H04L 63/18* (2013.01); *H04W 4/021* (2013.01); *G06F 2221/2113* (2013.01); *H04L 63/0853* (2013.01); *H04L 63/105* (2013.01)

(58) Field of Classification Search
CPC .......................... G06Q 20/341; G07C 9/00103
USPC ......... 235/375, 380, 382, 382.5, 454, 462.01, 235/470
See application file for complete search history.

(56) References Cited

U.S. PATENT DOCUMENTS

| | | | | |
|---|---|---|---|---|
| 7,555,361 | B2 * | 6/2009 | Nakamura et al. ............ 700/237 |
| 7,703,681 | B2 * | 4/2010 | Lee et al. ................. 235/462.01 |
| 8,024,234 | B1 * | 9/2011 | Thomas et al. ............ 705/26.61 |
| 8,379,874 | B1 * | 2/2013 | Simon ............................ 381/82 |
| 8,386,334 | B2 * | 2/2013 | Thomas et al. ............ 705/26.61 |
| 8,661,025 | B2 * | 2/2014 | Gibson et al. ................. 707/722 |
| 8,870,089 | B2 * | 10/2014 | Gibson et al. ................. 238/382 |
| 2001/0049628 | A1 * | 12/2001 | Icho ................................ 705/14 |
| 2003/0065805 | A1 * | 4/2003 | Barnes, Jr. .................... 709/231 |
| 2003/0105641 | A1 * | 6/2003 | Lewis ............................... 705/1 |

(Continued)

FOREIGN PATENT DOCUMENTS

| | | |
|---|---|---|
| EP | 1 030 272 | 8/2000 |
| EP | 2 151 795 | 2/2010 |

(Continued)

*Primary Examiner* — Paultep Savusdiphol
(74) *Attorney, Agent, or Firm* — Paul W. Martin; Schwegman, Lundberg & Woessner

(57) ABSTRACT

Access level management techniques which require less manual intervention. In one example, a registration system registers an individual for an access level and receives a mobile device identifier from the individual. The registration system generates an electronic pass, which may include a mobile barcode, granting the individual access at the requested access level, and provides the electronic pass to a mobile communication device of the individual using the mobile device identifier. In one application, an individual with a mobile barcode associated with priority access level privileges may be allowed to bypass a queue by using a priority lane.

20 Claims, 2 Drawing Sheets

(56) References Cited

U.S. PATENT DOCUMENTS

| | | | |
|---|---|---|---|
| 2003/0154169 A1* | 8/2003 | Yanai | 705/65 |
| 2003/0172037 A1* | 9/2003 | Jung et al. | 705/64 |
| 2003/0220835 A1* | 11/2003 | Barnes, Jr. | 705/14 |
| 2004/0188520 A1* | 9/2004 | Kohta | 235/382 |
| 2005/0065834 A1* | 3/2005 | Hale et al. | 705/8 |
| 2005/0242921 A1* | 11/2005 | Zimmerman et al. | 340/5.2 |
| 2006/0293929 A1* | 12/2006 | Wu et al. | 705/5 |
| 2008/0015983 A1* | 1/2008 | Spikes | 705/40 |
| 2008/0052192 A1* | 2/2008 | Fisher | 705/26 |
| 2008/0154623 A1* | 6/2008 | Derker et al. | 705/1 |
| 2008/0223940 A1* | 9/2008 | Lee et al. | 235/494 |
| 2009/0276364 A1* | 11/2009 | Iaia et al. | 705/80 |
| 2009/0319360 A1* | 12/2009 | Salemi | 705/14.25 |
| 2010/0131368 A1* | 5/2010 | Morris et al. | 705/14.65 |
| 2010/0131530 A1* | 5/2010 | Gibson et al. | 707/758 |
| 2010/0133339 A1* | 6/2010 | Gibson et al. | 235/382 |
| 2010/0169130 A1* | 7/2010 | Fineman et al. | 705/5 |
| 2010/0170947 A1* | 7/2010 | Christofferson | 235/382 |
| 2010/0219234 A1* | 9/2010 | Forbes | 235/375 |
| 2010/0228576 A1* | 9/2010 | Marti et al. | 705/5 |
| 2011/0022668 A1* | 1/2011 | Shih et al. | 709/206 |
| 2011/0131108 A1* | 6/2011 | Doxey | 705/26.1 |
| 2011/0166950 A1* | 7/2011 | Goldstein et al. | 705/26.3 |
| 2011/0282700 A1* | 11/2011 | Cockcroft | 705/5 |
| 2011/0320227 A1* | 12/2011 | Thomas et al. | 705/5 |
| 2012/0086549 A1* | 4/2012 | Barnes, Jr. | 340/5.61 |
| 2012/0089470 A1* | 4/2012 | Barnes, Jr. | 705/16 |
| 2012/0166960 A1* | 6/2012 | Salles | 715/738 |
| 2012/0221474 A1 | 8/2012 | Eicher | |
| 2013/0024216 A1* | 1/2013 | Fink | 705/5 |
| 2013/0024218 A1* | 1/2013 | Fink | 705/5 |
| 2013/0097006 A1* | 4/2013 | Evans et al. | 705/14.39 |
| 2013/0124234 A1* | 5/2013 | Nilsson et al. | 705/5 |
| 2013/0144726 A1* | 6/2013 | Pappas et al. | 705/14.67 |
| 2013/0173319 A1* | 7/2013 | Thomas et al. | 705/5 |
| 2013/0279757 A1* | 10/2013 | Kephart | 382/105 |
| 2014/0095333 A1* | 4/2014 | Zises | 705/26.1 |

FOREIGN PATENT DOCUMENTS

| | | |
|---|---|---|
| GB | 2 362 979 | 12/2001 |
| WO | 2004/027662 | 4/2004 |

\* cited by examiner

ACCESS LEVEL MANAGEMENT TECHNIQUES

BACKGROUND

The present invention relates to access management systems, and more specifically to access level management techniques.

There are many commercial environments where individuals form queues prior to gaining admittance or conducting a transaction. Some common queues include movie theaters, event venues, theme park attractions, and airport security screening. Often, merchants offer the ability to reserve a place in line or bypass a queue entirely by routing individuals along a different path or to the head of the queue. These services may be offered for a fee or free of charge and are commonly described as "priority access", "express lanes", etc.

The method for admitting an individual to a particular access path is often a manual process that may involve an individual presenting identification, a ticket, or other form of media denoting permission to an authorized level of service. For example, admitting an individual to a priority access level may involve checking the individual identification, ticket, or other form of media for appropriate indicia that the individual is authorized to receive priority access service.

Therefore, it would be desirable to provide access level management techniques that require less manual intervention.

SUMMARY

In accordance with the teachings of the present invention, access level management techniques are provided.

In one example embodiment, the access control method includes registering an individual for an access level including receiving a mobile device identifier from the individual, generating an electronic pass granting the individual access at the access level, and providing the electronic pass to a mobile communication device of the individual using the mobile device identifier.

One example electronic pass includes a mobile barcode to communicate access privileges. The mobile barcode may be part of a ticket and may be optimized by the registration system for display by the mobile communication device. When scanned at a queue location, the mobile barcode provides access level privileges. For example, an individual with priority access level privileges may be allowed to bypass a queue by using a priority lane.

BRIEF DESCRIPTION OF THE DRAWINGS

The present invention may take form in various components and arrangement of components and in various methods. The drawings are only for purposes of illustrating example embodiments and alternatives and are not to be construed as limiting the invention.

DETAILED DESCRIPTION

Figure 1:
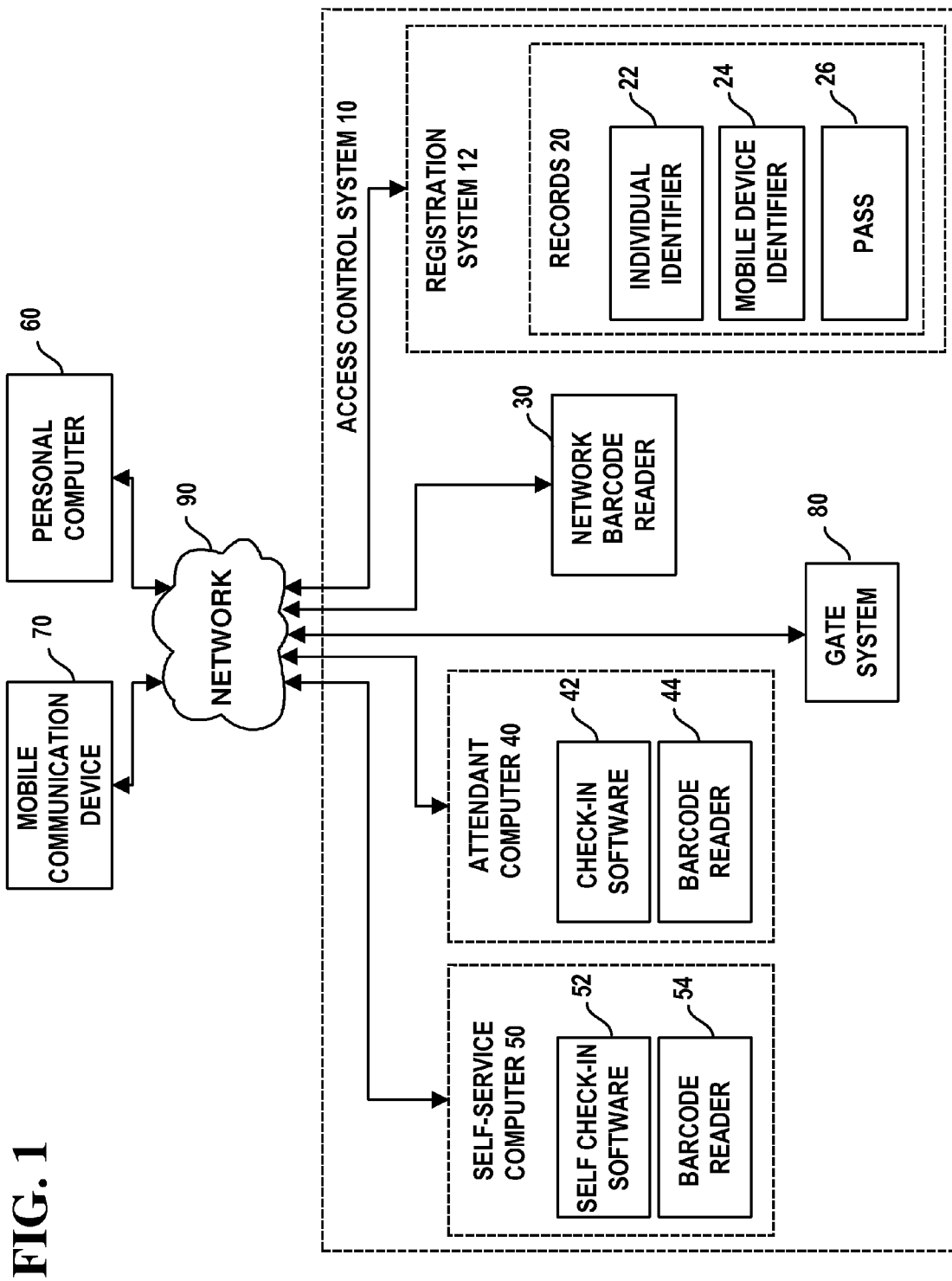
FIG. 1 is a block diagram illustrating an access control system.

Turning now to FIG. 1, access control system 10 is illustrated. Example applications of the invention include, but are not limited to, movie theaters, concert or other event venues, theme park attractions, airport security screening areas where individuals may benefit from having different access privileges to shorten their time in queues or avoid queues altogether.

Access control system 10 may manage any number of different levels of access. For example, an airport may have two levels of access, priority and non-priority, with priority access being associated with a greater level of service, and possibly cost, than non-priority access. A traveler with priority access may be entitled to wait in a shorter line or pass through airport security faster than a traveler with non-priority access.

Example access control system 10 includes registration system 12. Registration system 12 includes a processor, memory, and program and data storage. Registration system 12 may execute an operating system such as a Microsoft or Linux operating system. Registration system 12 further includes network circuitry for connecting to network 90, and may include other circuitry for connecting to peripherals. Registration system 12 may include a web server connected to the World Wide Web (WWW or "web") and provide web content, including web pages for facilitating registration. Registration system 12 is also capable of sending messages, such short message service (SMS or "text"), e-mail, automated voice, and/or other messages.

Network 90 may include any combination of wireless or wired networks, including local area, wide area, virtual private, and global communication networks, such as the Internet.

Registration system 12 maintains records 20. Records 20 include an individual identifier 22, a mobile device identifier 24, and a electronic pass 26.

Individual identifier 22 may include an individual's name, address, and/or other information.

Mobile device identifier 24 may include an electronic mail (e-mail) address and/or phone number.

Electronic pass 26 provides an individual with access at an authorized level. In an example embodiment, electronic pass 26 includes a barcode for display on an individual's mobile communication device 70 and for scanning, also known as a "mobile barcode". The mobile barcode is optimized for display based upon the display characteristics/capabilities of mobile communication device 70. An example method of optimizing a barcode for display on a mobile communication device 70 is disclosed in commonly assigned U.S. Pat. No. 7,693,744 to Forbes. This patent is hereby incorporated by reference. Other indicia besides barcodes are also envisioned.

An individual may register for an access level separately from or in connection with a different transaction, such as the purchase of a movie theater ticket, a concert or other event ticket, a theme park ticket, or an airline ticket.

Figure 2:
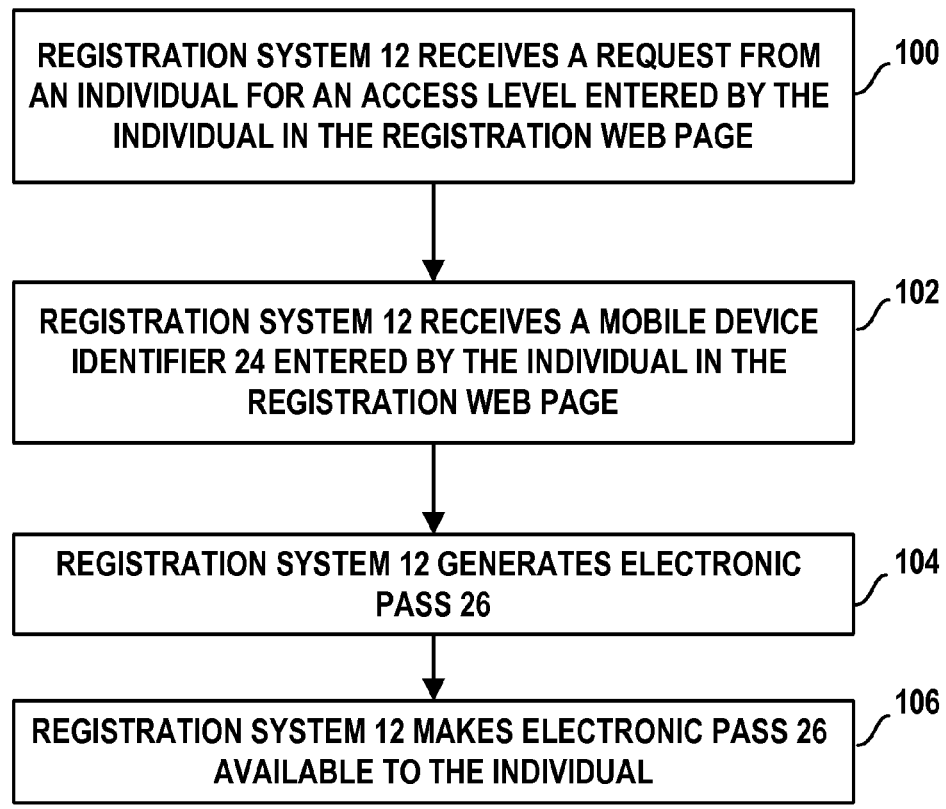
FIG. 2 is a flow diagram of a registration process for access privileges.

With reference to FIG. 2, an example registration process is illustrated. In this context, a successful registration process results in registration system 12 granting requested access rights to an individual. The registration process may or may not also involve remittance of payment from the individual. The registration process may or may not also be part of or connected with a different transaction, such as the purchase of a ticket.

An individual operates a computer, such as personal computer 60 or mobile communication device 70 to connect to registration system 12 through network 90. For this purpose, the computer may connect to a registration web site hosted by registration system 12 and download a web page to facilitate registration. The web page may include a registration form.

In step 100, registration system 12 receives a request from an individual for an access level, such as a priority access level, entered by the individual in the registration web page.

In step 102, registration system 12 receives a mobile device identifier 24, such as a mobile phone number, e-mail, or other address, entered by the individual in the registration web page.

The individual may also provide additional information including an individual identifier 22, such as a name, and/or a user name and password for logging into the web site and for accessing the individual's record 20.

In step 104, registration system 12 generates electronic pass 26, granting the individual access at the access level.

Registration system 12 may also create record 20 associated with individual identifier 22, mobile device identifier 24, and electronic pass 26.

In step 106, registration system 12 makes electronic pass 26 available to the individual.

In one example embodiment, registration system 12 sends a link to electronic pass 26 at reservation system 12 to mobile communication device 70 using mobile device identifier 24. In another example embodiment, mobile communication device 70 connects to registration system 12 under individual control, logs in with a user name and password established by the individual during registration, and accesses the link.

The link includes software which, when executed by mobile communication device 70 as a result of the individual clicking, tapping, or otherwise selecting the link, captures and sends information about the individual's mobile communication device 70, including display capabilities and/or characteristics, to registration system 12. Registration system 12 uses the information about the individual's mobile communication device 70 to optimize electronic pass 26, including optimizing the barcode, for display and for scanning by barcode readers 44 and 54.

In one example, the software associated with the link may be written in a programming language such as the Java programming and be hosted within the browser software.

As another example, the software associated with the link may include a script, such as JavaScript, combined with hypertext markup language (HTML) or other suitable web page language. The script may send a request for the electronic pass and information about display capabilities of mobile communication device 70 and receive an optimized electronic pass from registration system 12.

As an alternative to accessing the link, mobile communication device 70 may execute a software applet written to be executed within the operating system of mobile communication device 70 that connects to registration system 12 and obtains electronic pass 26. The mobile software applet may send a request for the electronic pass and information about display capabilities of mobile communication device 70 and receive an optimized electronic pass from registration system 12.

Returning to FIG. 1, personal computer 60 includes a processor, memory, and program and data storage. Personal computer 60 may execute an operating system such as a Microsoft, Apple, Linux, or other operating system. Personal computer 60 may include web browser software for connecting to the web site of registration system 12.

Personal computer 60 further include graphics circuitry for connecting to a display, network circuitry for connecting to network 90, and other circuitry for connecting to other peripherals, such as a printer, a mouse, and a keyboard.

Mobile communication device 70 may include a Smartphone, personal digital assistant, or other portable communication device. Mobile communication device 70 includes a processor, memory, and program and data storage. Mobile communication device 70 may execute an operating system such as a Microsoft, Apple, Google, or other operating system. Mobile communication device 70 may include web browser software for connecting to the web site of registration system 12.

Mobile communication device 70 further include graphics circuitry for connecting to a display, network circuitry for connecting to network 90, and other circuitry for connecting to other peripherals, such as a touchscreen.

Access control system 10 further includes a scanning station at each access control location, such as at entrance to a queue or at the head of a queue.

An example scanning station may include a network barcode reader 30 operated by an attendant. During check-in, an attendant operates network barcode reader 30 to scan a mobile barcode and determine an authorized level of access for the individual from the contents of the mobile barcode.

In one example embodiment, network barcode reader 30 may also verify that the mobile barcode is valid by connecting to registration system 12 and comparing the pass information, including the mobile barcode, to information in records 20.

In another example embodiment, network barcode reader 30 may be programmed with business rules that establish permitted time windows, scanning locations, and other context-aware cues that determine valid and invalid mobile barcodes. Network barcode reader 30 may store scanned information for later sending to registration system 12.

Network barcode reader 30 may include a portable or handheld or stationary barcode reader or scan terminal with built-in barcode reader with wireless or wired access to network 90.

As another example, the scanning station may include attendant computer 40 and barcode reader 44, which are operated by an attendant.

Attendant computer 40 includes a processor, memory, and program and data storage. Attendant computer 40 may execute an operating system such as a Microsoft, Apple, Linux, or other operating system. Attendant computer 40 includes barcode reader 42 for scanning mobile barcodes. Attendant computer 40 further include graphics circuitry for connecting to a display, network circuitry for connecting to network 90, and other circuitry for connecting to other peripherals, such as a printer, a mouse, and a keyboard.

Attendant computer 40 executes check-in software 42. During check-in, an attendant operates check-in software 42 to scan a mobile barcode and determine an authorized level of access for the individual from the contents of the mobile barcode. Check-in software 42 may also verify that the mobile barcode is valid by connecting to registration system 12 and comparing the pass information, including the barcode, to information in records 20. After determining the authorized level of access for the individual, the attendant directs the individual to an appropriate entrance, queue, aisle or other path.

As yet another example, the scanning station may include self-service computer 50 and barcode reader 54, which are operated by an individual.

Self-service computer 50 includes a processor, memory, and program and data storage. Self-service computer 50 may execute an operating system such as a Microsoft, Apple, Linux, or other operating system. Self-service computer 50 includes barcode reader 52 for scanning mobile barcodes. Self-service computer 50 further include graphics circuitry for connecting to a display, network circuitry for connecting to network 90, and other circuitry for connecting to other peripherals, such as a printer, a mouse, and an input device. The display and input device may be combined as a touch screen.

Self-service computer 50 executes check-in software 52. During check-in, an individual operates check-in software 52 to scan a mobile barcode and determine an authorized level of access from the contents of the mobile barcode. Check-in software 52 may also verify that the mobile barcode is valid by connecting to registration system 12 and comparing the pass information, including the mobile barcode, to information in records 20. After determining the authorized level of access for the individual, check-in software 52 displays a message directing the individual to an appropriate entrance, queue, aisle or other path.

To enhance security and reinforce access rights, any of network barcode reader 30, attendant computer 40, and self-service computer 50 may operate a gate system 80 to control access based upon the individual's access level.

In some environments, more than one scanning station may be employed. For example, a second scanning station may be situated at a queue end point so as to prevent "line jumping" or "cutting" into higher access level queues by unauthorized individuals. When two or more scanning stations are used for the same queue, information such as "total wait time" may be calculated by the scanning stations by comparing the time signature of the first and second scans (and so forth for more than two scanning stations.). Scanning stations may also provide numbers and timing of scanned barcodes to assist with statistical analysis of traffic patterns by registration system 12.

Advantageously, these access control techniques authenticate individuals and minimize line-jumping, fraud and other abuse.

In an example application of these access control techniques, a merchant selling subscriptions to priority access lanes at airport security checkpoints on an annual basis may instead or also offer one-day priority access passes directly or through an airline to boost enrollment. An individual may purchase an airline ticket and request a one-day priority pass from the airline.

The individual receives a mobile airline boarding pass from the airline for display by the individual's mobile communication device 70. The mobile boarding pass contains a barcode that is encoded with additional information denoting the individual's one-day pass. Scanning of the barcode at a scanning station reveals the one-day pass. The individual is granted permission to use the priority access lane.

In another example application of there access control techniques, a theme park has an attraction reservation system, allowing individuals to reserve a time to come back and get on a popular ride or see a show or other attraction with little to no wait. Some theme parks offer this service for free and some for a fee. In some cases, attraction reservation systems may include kiosks for dispensing reservations at select attractions. In other cases, attraction reservation systems may provide reservations at a reservation location separate from the location of the attraction.

Using the techniques of the present invention, an individual may obtain a reservation from a theme park resort or from the theme park's website using a personal computer or mobile communication device and a web browser or mobile application. The individual's mobile communication device 70 receives a mobile barcode from the theme park reservation system. The theme park reservation system encrypts the mobile barcode to prevent fraudulent copies. Existing reservation ticketing machines may also be modified to also dispense tickets with barcodes. The attraction host or hostess scans the mobile barcode displayed by the individual's mobile communication device 70 using a handheld barcode reader. The barcode reader may be networked in order to perform a validation process on the mobile barcode. Two barcode readers, one at a main entrance to the attraction (end of the queue) and a second at the attraction front of the queue, facilitate calculation of attraction wait times.

Using the techniques of the present invention, an individual may obtain a reservation from a theme park resort or from the theme park's website using a personal computer or mobile communication device and a web browser or mobile application. The individual's mobile communication device 70 receives a mobile barcode from the theme park reservation system. The theme park reservation system encrypts the mobile barcode to prevent fraudulent copies. Existing reservation ticketing machines may also be modified to also dispense tickets with barcodes. The attraction host or hostess scans the mobile barcode displayed by the individual's mobile communication device 70 using a handheld barcode reader. The barcode reader may be networked in order to perform a validation process on the mobile barcode. Two barcode readers, one at a main entrance to the theme park and a second at the attraction, facilitate calculation of attraction wait times.

Other applications at these and other venues are also envisioned.

Although the present invention has been described with particular reference to certain preferred embodiments thereof, variations and modifications of the present invention can be effected within the spirit and scope of the following claims.

What is claimed is:

1. A processor-implemented access level management method programmed in memory and/or a non-transitory computer-readable medium and to execute on one or more processors configured to execute the method, comprising:

registering an individual for an access level including receiving a mobile device identifier from the individual, wherein the access level is relevant to access privileges for the individual available from different levels of access and including with the access level one of: a specific queue, entrance, or aisle for directing the individual for service when the service is requested by the individual;

generating an electronic pass granting the individual access at the access level, wherein generating further includes generating the electronic pass as a mobile barcode encrypted to prevent fraudulent use of the mobile bar code without a mobile communication device of the individual; and providing the electronic pass to the mobile communication device of the individual using the mobile device identifier for presenting to a network scanner for subsequent validation of the electronic pass, the network scanner further verifying the electronic pass by processing business rules that defined permitted time windows for the electronic pass and valid scanning locations for the electronic pass and wherein providing further includes providing message information to the mobile communication device that causes the mobile communication device to display a message directing the individual to the specific queue, the entrance, or the aisle for the access level when the electronic pass is successfully scanned by the network scanner.

2. The method of claim 1, wherein registering comprises receiving a request from the individual for the access level entered by the individual in a registration web page.

3. The method of claim 2, wherein registering further comprises receiving an individual identifier entered by the individual in the registration web page.

4. The method of claim 2, wherein registering further comprises creating a record associated with mobile device identifier and the electronic pass.

5. The method of claim 2, wherein registering further comprises receiving a user name and a password for logging into the registration web site entered by the individual in the registration web page.

6. The method of claim 1, wherein the mobile device identifier comprises a phone number.

7. The method of claim 1, wherein the mobile device identifier comprises an email address.

8. The method of claim 1, wherein generating comprises creating the mobile barcode based at least in part on the access level.

9. The method of claim 1, wherein providing comprises sending a second message to the mobile communication device containing a link to the electronic pass using the mobile device identifier.

10. The method of claim 1, wherein providing further comprises receiving information about display capabilities of the mobile communication device upon selection of the link, optimizing the electronic pass for display by the mobile communication device using the display capabilities, and sending an optimized electronic pass to the mobile communication device.

11. The method of claim 1, wherein providing comprises receiving a request for the electronic pass and information about display capabilities of the mobile communication device from the mobile communication device via a mobile software application executed by the mobile communication device, optimizing the electronic pass for display by the mobile communication device using the display capabilities, and sending an optimized electronic pass to the mobile communication device via the mobile software application.

12. The method of claim 1, further comprising receiving payment from the individual for the access level.

13. The method of claim 1, further comprising receiving payment from the individual for a service associated with the access level.

14. The method of claim 1, wherein the access level comprises an access level granting the individual priority over other individuals.

15. An access level management system comprising:
a registration system for registering an individual for an access level including receiving a mobile device identifier from the individual, for generating an electronic pass granting the individual access at a location at the access level, the electronic pass generated as a mobile bar code for a mobile communication device of the individual to prevent fraudulent use of the mobile barcode with the mobile communication device of the individual, and providing the electronic pass to the mobile communication device of the individual using the mobile device identifier for presenting to a network scanner for subsequent validation of the electronic pass, the network scanner further verifying the electronic pass by processing business rules that defined permitted time windows for the electronic pass and valid scanning locations for the electronic pass, and wherein the access level is relevant to access privileges for the individual available from different levels of access and include with the access level one of: a specific queue, entrance, or aisle to direct the individual for service when the service is requested by the individual, and wherein the registration system is configured to provide message information to the mobile device that causes the mobile device to display a message directing the individual to the specific queue, the entrance, or the aisle for the access level when the electronic pass is successfully scanned by the network scanner.

16. The system of claim 15, wherein the electronic pass comprises displaying on a display of the mobile communication device the mobile barcode.

17. The system of claim 16, wherein the registration system is also for receiving barcode information from a barcode reader at the location and for verifying that the barcode information is associated with a registered individual.

18. The system of claim 15, further comprising a reader at the location for reading the electronic pass to determine the access level and for contacting the registration system to verify that the electronic pass is valid.

19. The system of claim 15, further comprising a check-in computer and a reader at the location for reading the electronic pass to determine the access level and for contacting the registration system to verify that the electronic pass is valid.

20. The system of claim 19, further comprising a gate system at the location for controlling access based upon the access level.

* * * * *